United States Patent
Smith et al.

(10) Patent No.: US 11,760,020 B2
(45) Date of Patent: *Sep. 19, 2023

(54) LOW PULL FORCE FILAMENT DELIVERY SYSTEM

(71) Applicant: Stratasys, Inc., Eden Prairie, MN (US)

(72) Inventors: Cody Smith, Wayzata, MN (US); Christopher Herbst, Saint Louis Park, MN (US); Ross Michalkiewicz, Golden Valley, MN (US); Shawn Michael Koop, Blaine, MN (US); Jordan Nadeau, St. Louis Park, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,802

(22) Filed: Oct. 27, 2022

(65) Prior Publication Data

US 2023/0114749 A1     Apr. 13, 2023

Related U.S. Application Data

(62) Division of application No. 17/112,517, filed on Dec. 4, 2020, now Pat. No. 11,485,085.

(Continued)

(51) Int. Cl.
*B29C 64/321* (2017.01)
*B29C 64/118* (2017.01)
(Continued)

(52) U.S. Cl.
CPC .......... *B29C 64/321* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS

| 5,121,329 A | 6/1992 | Crump |
| 5,181,433 A | 1/1993 | Ueno et al. |

(Continued)

FOREIGN PATENT DOCUMENTS

| CN | 207044697 U | 2/2018 |
| EP | 2117793 A1 | 11/2009 |

(Continued)

OTHER PUBLICATIONS

International Search Report and Written Opinion of International Application No. PCT/US2019/061524 dated Jun. 8, 2020.

(Continued)

*Primary Examiner* — Armand Melendez
(74) *Attorney, Agent, or Firm* — Peter J. Ims; Westman, Champlin & Koehler, P.A.

(57) ABSTRACT

A low pull force system for feeding a filament along a feed path from a source to a liquefier in a 3D printer includes a low compressive force loading drive for advancing filament from the source, a feed drive for advancing filament into the liquefier, and an in-line accumulator comprising a telescoping joint positioned in the feed path between the loading drive and the feed drive. When the telescoping joint is in a contracted position, the loading drive activates to feed filament into the feed path at a rate faster than a rate at which the feed drive advances filament into the liquefier, causing the telescoping joint to expand and accrue a slack of filament in the feed path. When the telescoping joint reaches an extended position, the loading drive deactivates while the feed drive continues to advance filament into the liquefier, and the slack of filament is consumed.

13 Claims, 11 Drawing Sheets

Related U.S. Application Data

(60) Provisional application No. 62/963,903, filed on Jan. 21, 2020.

(51) Int. Cl.
*B29C 64/209* (2017.01)
*B33Y 50/02* (2015.01)
*B33Y 10/00* (2015.01)
*B33Y 30/00* (2015.01)
*B29C 64/393* (2017.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,340,433 A | 8/1994 | Crump |
| 5,503,785 A | 4/1996 | Crump et al. |
| 6,004,124 A | 12/1999 | Swanson et al. |
| 6,547,995 B1 | 4/2003 | Comb |
| 6,722,872 B1 | 4/2004 | Swanson et al. |
| 6,923,634 B2 | 8/2005 | Swanson et al. |
| 7,063,285 B1 | 6/2006 | Turley et al. |
| 7,127,309 B2 | 10/2006 | Dunn et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,891,964 B2 | 2/2011 | Skubic et al. |
| 7,910,041 B1 | 3/2011 | Priedeman, Jr. |
| 7,938,356 B2 | 5/2011 | Taatjes et al. |
| 8,403,658 B2 | 3/2013 | Swanson |
| 8,419,996 B2 | 4/2013 | Swanson et al. |
| 8,439,665 B2 | 5/2013 | Batchelder et al. |
| 8,647,102 B2 | 2/2014 | Swanson et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 9,321,609 B2 | 4/2016 | Koop et al. |
| 9,512,544 B2 | 12/2016 | Heikkila |
| 10,513,104 B2 | 12/2019 | Barclay et al. |
| 10,513,107 B2 | 12/2019 | Flannigan et al. |
| 11,267,199 B2 | 3/2022 | Smith et al. |
| 2008/0213419 A1 | 9/2008 | Skubic et al. |
| 2014/0159273 A1 | 6/2014 | Koop et al. |
| 2015/0094222 A1 | 3/2015 | Heston et al. |
| 2016/0052208 A1 | 2/2016 | Debora et al. |
| 2018/0027615 A1 | 1/2018 | Rios et al. |
| 2018/0043627 A1 | 2/2018 | Barclay et al. |
| 2018/0154586 A1 | 6/2018 | Wang et al. |
| 2018/0304533 A1 | 10/2018 | Burnham et al. |
| 2018/0345597 A1 | 12/2018 | Wilenski et al. |
| 2020/0002121 A1 | 1/2020 | Manuel et al. |
| 2021/0221061 A1 | 7/2021 | Smith et al. |

FOREIGN PATENT DOCUMENTS

| | | |
|---|---|---|
| WO | 0189714 A1 | 11/2001 |
| WO | 2008100467 A1 | 8/2008 |
| WO | 2020102569 A2 | 5/2020 |

OTHER PUBLICATIONS

Communication pursuant to Rules 161(1) and 162 EPC from European Patent Application No. 19820930.6, dated Jun. 22, 2021.
First Office Action from Chinese Patent Application No. 201990001142.6 dated Dec. 9, 2021.
U.S. Prosecution history from U.S. Appl. No. 17/112,517, filed Dec. 4, 2020 including: Notice of Allowance and Fee(s) Due dated Jul. 28, 2022; and Requirement for Restriction/Election dated Mar. 4, 2022.

LOW PULL FORCE FILAMENT DELIVERY SYSTEM

CROSS-REFERENCE TO RELATED APPLICATION

The present application is a divisional of U.S. patent application Ser. No. 17/112,517, filed Dec. 4, 2020, which is based on and claims the benefit of U.S. provisional patent application Ser. No. 62/963,903, filed Jan. 21, 2020, the contents of each of which are hereby incorporated by reference in their entirety.

BACKGROUND

The present disclosure relates to additive manufacturing systems for printing or otherwise building 3D parts by material extrusion techniques. In particular, the present disclosure relates to filament delivery systems for use in extrusion-based 3D printers.

Additive manufacturing, also called 3D printing, is generally a process in which a three-dimensional (3D) object is built by adding material to form a part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills the diameter of the liquefier tube, providing a plug-flow type pumping action to extrude the molten filament material further downstream through the nozzle tip. The extruded material is deposited in a continuous flow in toolpaths according to digital data based on the digital representation of a part to be printed. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication, and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

Whichever print system architecture is used, the printing operation for fused deposition modeling is dependent on a predictable and controlled advancement of filament into the liquefier at a feed rate that will extrude material at a targeted extrusion rate. Thus, there is an ongoing need for improved reliability of filament feeding and delivering in printing 3D parts with extrusion-based additive manufacturing techniques.

SUMMARY

An aspect of the present disclosure is directed to a system for feeding a filament from a source to a print head in a 3D printer. The system includes a loading drive for advancing filament from the source and a feed drive for advancing filament into the print head. The system includes a filament path connecting the loading drive and the feed drive, the filament path having an in-line accumulator comprising a telescoping joint configured to expand and contract the filament path between the loading drive and the feed drive whereby a slack of filament is accrued and consumed. The system includes a controller configured to control the loading drive and the feed drive, wherein when the telescoping joint is in a first position where the filament path is contracted, the loading drive is activated at a rate faster than a rate at which filament is advanced into the print head such that the filament path expands until the telescoping joint reaches a second position, wherein the loading drive is deactivated.

Another aspect of the present disclosure relates to a system for feeding a filament from a source to a liquefier in a 3D printer. The system includes a source of filament and a loading drive located proximate the source of the filament, the loading drive having an inlet and an outlet, the filament source coupled to the inlet of the loading drive with a first conduit. The system includes a length of tubing having a first end and a second end wherein at least a portion of the tubing is flexible, the first end being directly or indirectly attached to the outlet of the loading drive. The system includes an accumulator assembly having at least one accumulator having a through bore extending from a first end to a second end wherein the second end of the length of tubing is coupled to a pin slidably movable within the through bore to form a telescoping joint. The at least one accumulator includes a level sensor that triggers the loading drive to advance filament from the source into the first conduit, through the length of tubing, and into the through bore of the accumulator when the pin reaches a contracted position in the through bore. A print head is coupled to an outlet of the through bore in the accumulator assembly with a second conduit, the print head comprising a feed drive and a liquefier. The effective length of the tubing between the loading drive and the accumulator assembly is increased by operating the loading drive at a rate greater than a rate of which the feed drive feeds material into the print head such that the telescoping joint expands to create a slack of filament in the tubing. The loading drive is triggered to stop operation when the pin is no longer detected at the contracted position and/or when the pin is detected at an extended position, wherein the feed drive then consumes the slack of filament causing the telescoping joint to contract until the pin is again sensed at the downstream location, which again triggers operation of the loading drive.

Another aspect of the present disclosure relates to a method of delivering a consumable feedstock material configured as filament from a source to a print head of a fused deposition modeling 3D printer. The method includes providing a filament feed drive configured to advance filament into a liquefier at a controlled rate, providing a filament loading drive configured to advance filament from a source into a feed path leading to the filament feed drive at a rate that exceeds the controlled rate of the feed drive, and providing a guide tube defining the feed path from an upstream location proximate the filament loading drive to a downstream location proximate the filament feed drive, and providing an accumulator in-line with the guide tube between the loading drive and the feed drive. The accumulator comprises a through bore positioned axially along the feed path, a pin that reciprocates axially along a bearing surface of the through bore from a contracted position to an extended position, and a limit sensor configured to detect the location of the pin, wherein the pin is coupled to the guide tube upstream of the accumulator. The method includes signaling the filament loading drive to advance filament into the feed path when the accumulator pin reaches the contracted position, controlling the feed drive to advance filament from the feed path into the liquefier, and signaling the filament loading drive to stop advancing filament into the feed path when the accumulator pin reaches the extended position while the feed drive continues to advance filament from the feed path into the liquefier, and continuing to signal the filament loading drive to advance filament into the feed path when the accumulator pin reaches the contracted position and to signal the filament loading drive to stop advancing filament into the feed path when the accumulator pin reaches the extended position. In this manner, a slack of filament in the guide tube is created by expansion of the accumulator in a telescoping manner when the filament loading drive advances filament along the feed path, and the slack of filament is consumed when the filament loading drive stops advancing filament into the feed path. The accumulator is used in tandem with the filament loading drive to expand and contract the feed path and thereby cyclically accrue and consume a slack of filament within the feed path. The loading drive for advancing filament along the feed path is deactivated until the accumulator is contracted and is activated until the accumulator is expanded. The method includes repeating the loading drive activation and deactivation steps to cycle the accumulator pin between the expanded and contracted positions so that a slack of filament is continually being either accrued or consumed.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

Figure 1:
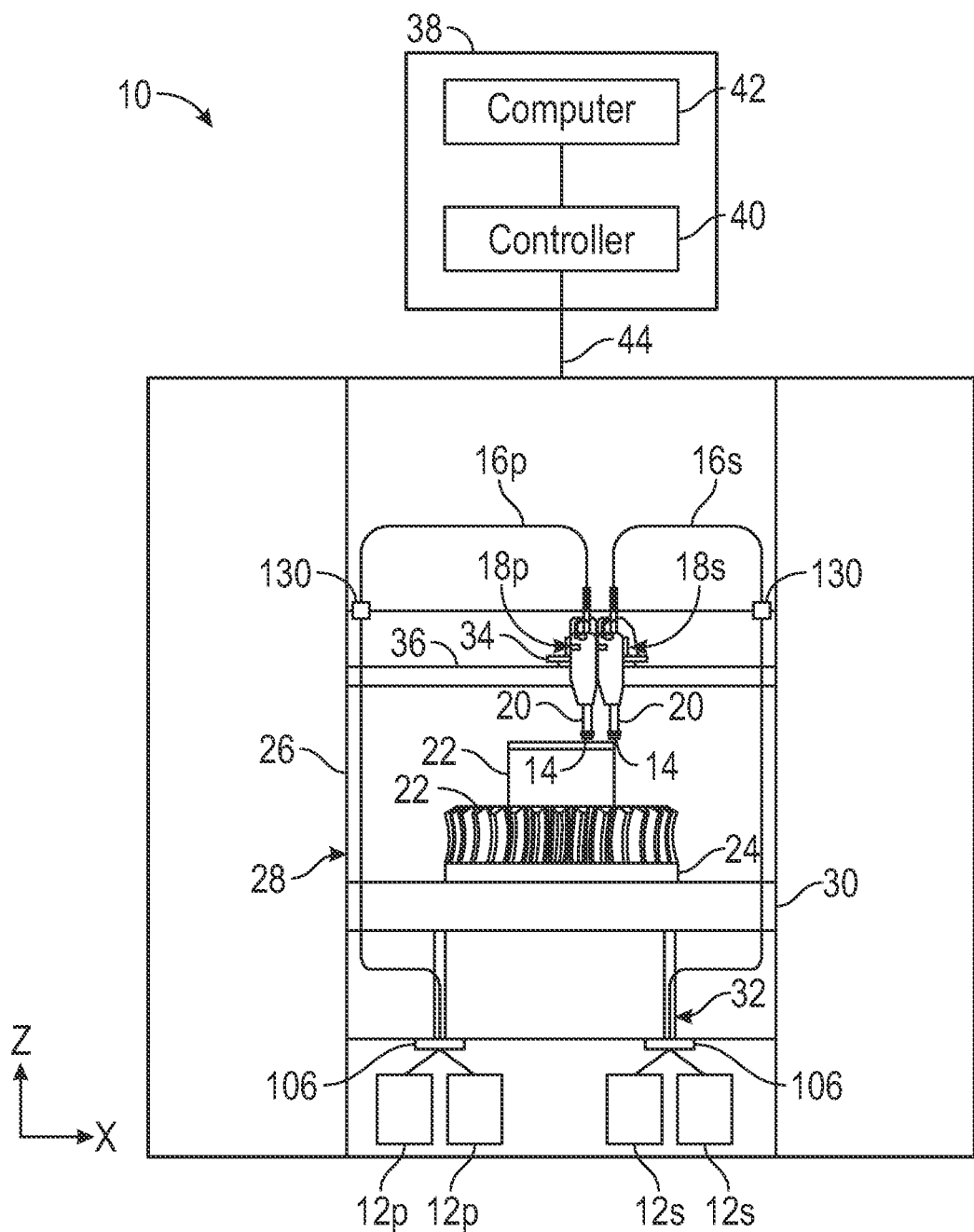
FIG. 1 is a front schematic view of an extrusion based additive manufacturing system, which utilizes a filament drive mechanism of the present disclosure.

The present disclosure is directed to a filament delivery system for feeding consumable feedstock materials in filament form to a liquefier or print head of a fused deposition modeling additive manufacturing system or 3D printer, wherein the system delivers filament using a relatively low pull force. The low pull force filament delivery system provides a substantially closed or sealed feed path for advancing filament to the print head, to prevent the filament from being adversely affected by ambient conditions such as, but not limited to, absorption of moisture from the ambient air. Further, the low pull force filament delivery system allows filament to be reliably fed to a print head and extruded to print a part.

The filament delivery system includes a filament loading drive configured to advance filament from a source of the filament feedstock, which typically is wound onto a rotating spool but may also be wrapped in a spool-less configuration. As discussed in the present disclosure the exemplary 3D printer retains the filament source or sources in bays located below the print chamber. However, the source of the filament can be located in any suitable location including locations along the sides of the chamber, above the chamber and a location external to the printer. Regardless of the filament location source, in some embodiments the loading drive is located proximate the source of the filament feed stock to minimize the pull force, and therefore tensile stress, on the filament as the filament is pulled from the source and into the loading drive by the feed drive.

The filament loading drive applies a force to the filament that advances the filament through a flexible guide tube that defines a feed path to a filament feed drive carried by or associated with a print head. The feed drive engages and advances the filament from the guide tube and drives the filament into a liquefier which typically is a component of the print head. In the liquefier, the filament is heated to a molten state and into a melt pool. Driving the unmelted filament into the melt pools acts like a piston such that the molten material is extruded with plug flow from an extrusion nozzle downstream of the liquefier in the print head.

The present disclosure includes a substantially sealed filament feed path between the loading drive and the feed drive, where a length of the sealed filament feed path is expandable and contractable through providing an accumulator that has telescoping members in-line with a flexible guide tube that defines the filament feed path. The length of the filament guide tube increases to create a longer filament path as the loading drive forces filament into the filament path at a rate greater than the rate at which the feed drive advances the filament into the liquefier. The additional length of filament accrued within the longer path provides a slack of filament for consumption by the print head that reduces the level of tensile pull force on the filament as it is advanced into the liquefier by the feed drive. Once a preselected amount of filament slack accumulates, the loading drive is signaled to stop advancing filament into the filament path and the filament slack is consumed by the print head. As the filament is consumed downstream, the loading drive continues to engage the filament and prevent further filament from being advanced from the source, until the filament slack is consumed and the loading drive is signaled to again advance filament from the source into the filament path.

Repeating the process of expanding and contracting the filament path by coordinating the operation of the loading drive with the accumulator to accrue and consume a slack of filament has many benefits, including reducing tensile stress on the filament (thereby reducing incidences of filament breakage or fracture), reducing burden on the feed drive motor, lessening frictional drag of filament moving through the guide tube, reducing wear on the guide tube, reducing pull force variations, and reducing occurrences of spin outs by the feed drive. Furthermore, when the feed drive advances filament to supply the liquefier, it is pulling on the filament only to the extent that it is still in a slack or excess length; the filament upstream of the slack is not subjected to pull force as a result. Thus, the capability and reliability of feeding highly filled and otherwise fragile filaments to the print head is increased.

The present disclosure may be used with any suitable extrusion-based 3D printer. For example, FIG. 1 illustrates an exemplary 3D printer 10 that has a substantially horizontal print plane where the part being printed and indexed in a substantially vertical direction as the part is printed in a layer by layer manner using two print heads 18$p$ for part material and 18$s$ for support material. The illustrated 3D printer 10 uses four consumable assemblies, two consumable assemblies 12$p$ for part material and two consumable assemblies 12$s$ for support material. Each consumable assembly 12$p$ and 12$s$ is an easily loadable, removable, and replaceable supply devices such that two supplies of a consumable filament of part material and two supplies of consumable material for support material can be retained and utilized in a single 3D printer 10. All of the consumable assemblies 12$p$ and 12$s$ may be identical in structure or different in structure. Each consumable assembly 12 may retain the consumable filament on a wound spool, a spool-less coil, or other supply arrangement, such as discussed for example in Turley et al. U.S. Pat. No. 7,063,285; Taatjes at al., U.S. Pat. No. 7,938,356; and Mannella et al., U.S. Pat. Nos. 8,985,497 and 9,073,263. While four assemblies are illustrated, the present disclosure is not limited to a 3D printer with four assemblies. Rather, the 3D printer of the present disclosure can utilize any number of assemblies including two or more assemblies containing the same or different consumable materials.

Figure 2:
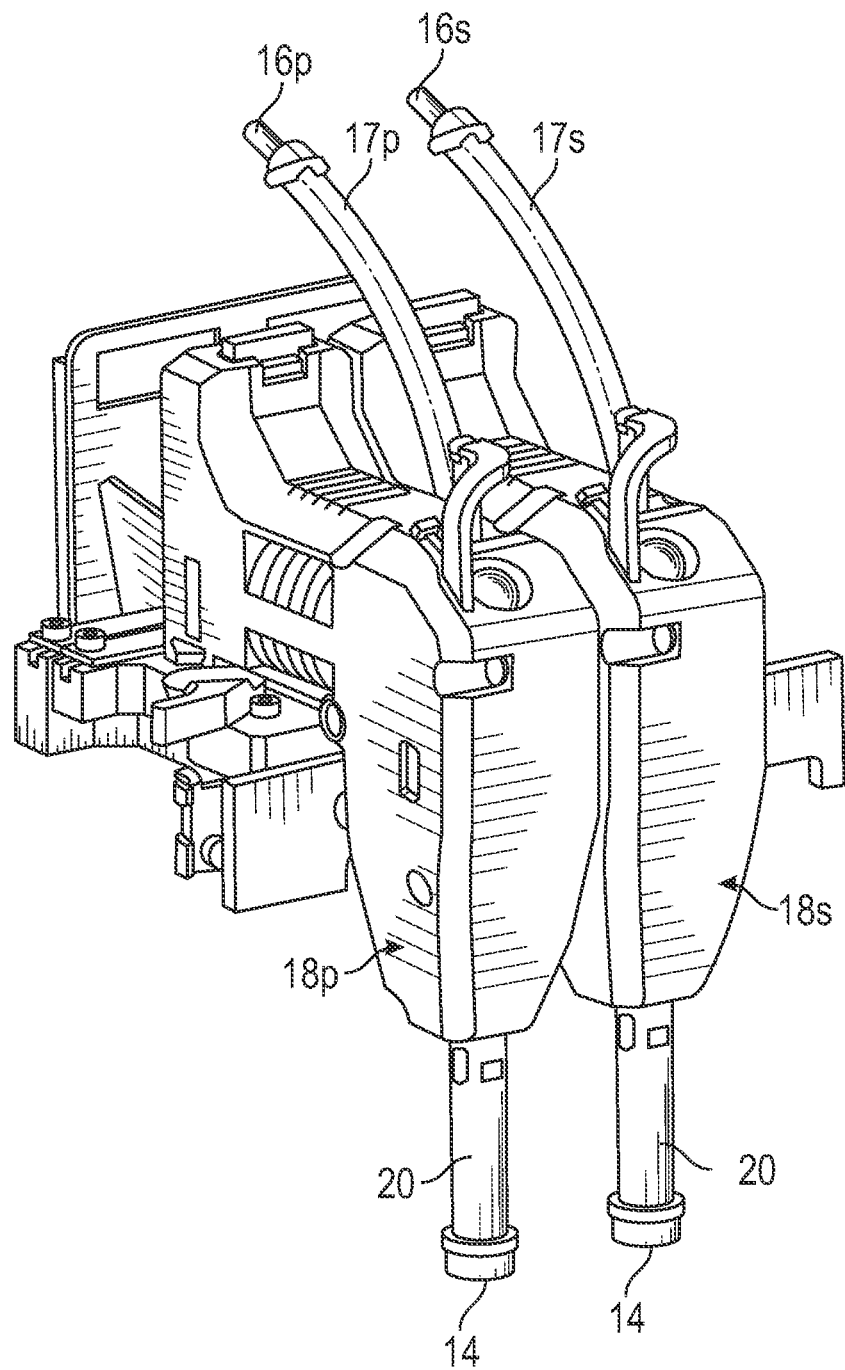
FIG. 2 is a view of a pair of print heads on a head carriage.

As shown in FIG. 2, each print head 18$p$ and 18$s$ is a device comprising a housing that retains a liquefier 20 having a nozzle tip 14. A filament feed path 16$p$ and 16$s$ interconnects each consumable assembly 12$p$ and 12$s$ and print head 18$p$ and 18$s$, and provides a filament feed path from the filament supply to the print head, where the filament feed paths 16$p$ and 16$s$ are substantially sealed from ambient conditions. Upper ends of feed path 16$p$ and 16$s$ can be attached to the print heads 18$p$ and 18$s$ using end piece 17$p$ and 17. In the illustrated embodiment, the end piece 17$p$ and 17$s$ is sufficiently rigid to retain an arcuate configuration of the feed path 16$p$ and 16$s$ with a radius that prevents the filament from bending too sharply which can cause the filament to break or crease, and will increase the frictional drag and pull force experienced by the filament.

Exemplary 3D printer 10 prints parts or models and corresponding support structures (e.g., 3D part 22 and support structure 24) from the part and support material filaments, respectively, of consumable assemblies 12, by extruding roads of molten material along toolpaths. During a build operation, successive segments of consumable filament are driven into print head 18 where they are heated and melt in liquefier 20. The melted material is extruded through nozzle tip 14 in a layer-wise pattern to produce printed parts. Suitable 3D printers 10 include fused deposition modeling systems developed by Stratasys, Inc., Eden Prairie, Minn. under the trademark "FDM".

As shown, the 3D printer 10 includes system cabinet or frame 26, chamber 28, platen 30, platen gantry 32, head carriage 34, and head gantry 36. Cabinet 26 may include container bays configured to receive consumable assemblies 12p and 12s. In alternative embodiments, the container bays may be omitted to reduce the overall footprint of 3D printer 10. In these embodiments, consumable assembly 12 may stand proximate to printer 10.

Chamber 28 contains platen 30 for printing 3D part 22 and support structure 24. Chamber 28 may be an enclosed environment and may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape, or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain print heads 18p and 18s, and is supported by head gantry 36. In the shown embodiment, head gantry 36 is a mechanism configured to move head carriage 34 (and the retained print heads 18p and 18s) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18p and 18s) may be configured to move along the z-axis. Other similar arrangements may also be used such that one or both of platen 30 and print heads 18p and 18s are moveable relative to each other. Platen 30 and head carriage 34 (and print heads 18) may also be oriented along different axes. For example, platen 30 may be oriented vertically and print heads 18p and 18s may print 3D part 22 and support structure 24 along the x-axis or the y-axis.

Figure 2A:
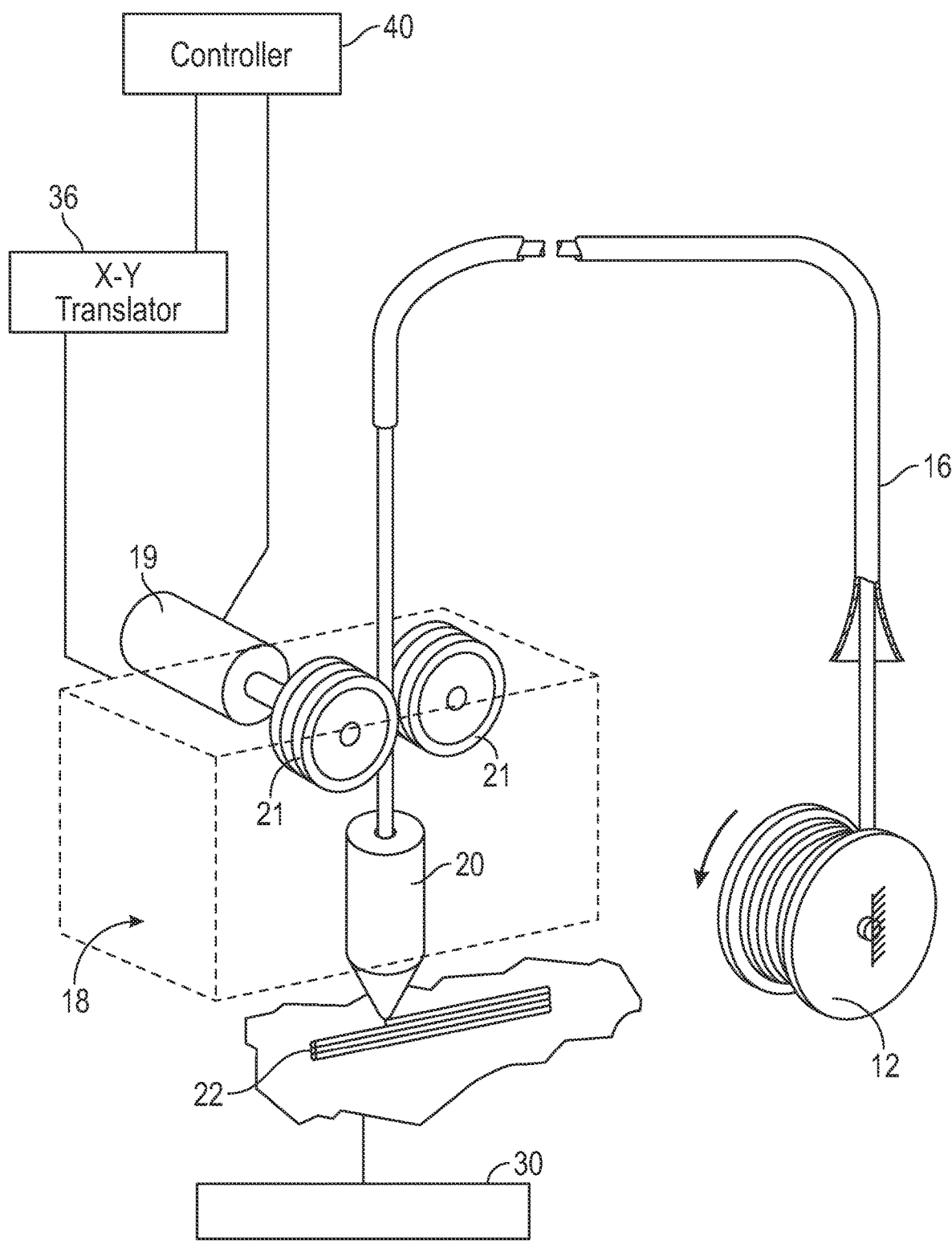
FIG. 2A is a schematic view of a feed head drive
Figures 3, 4:
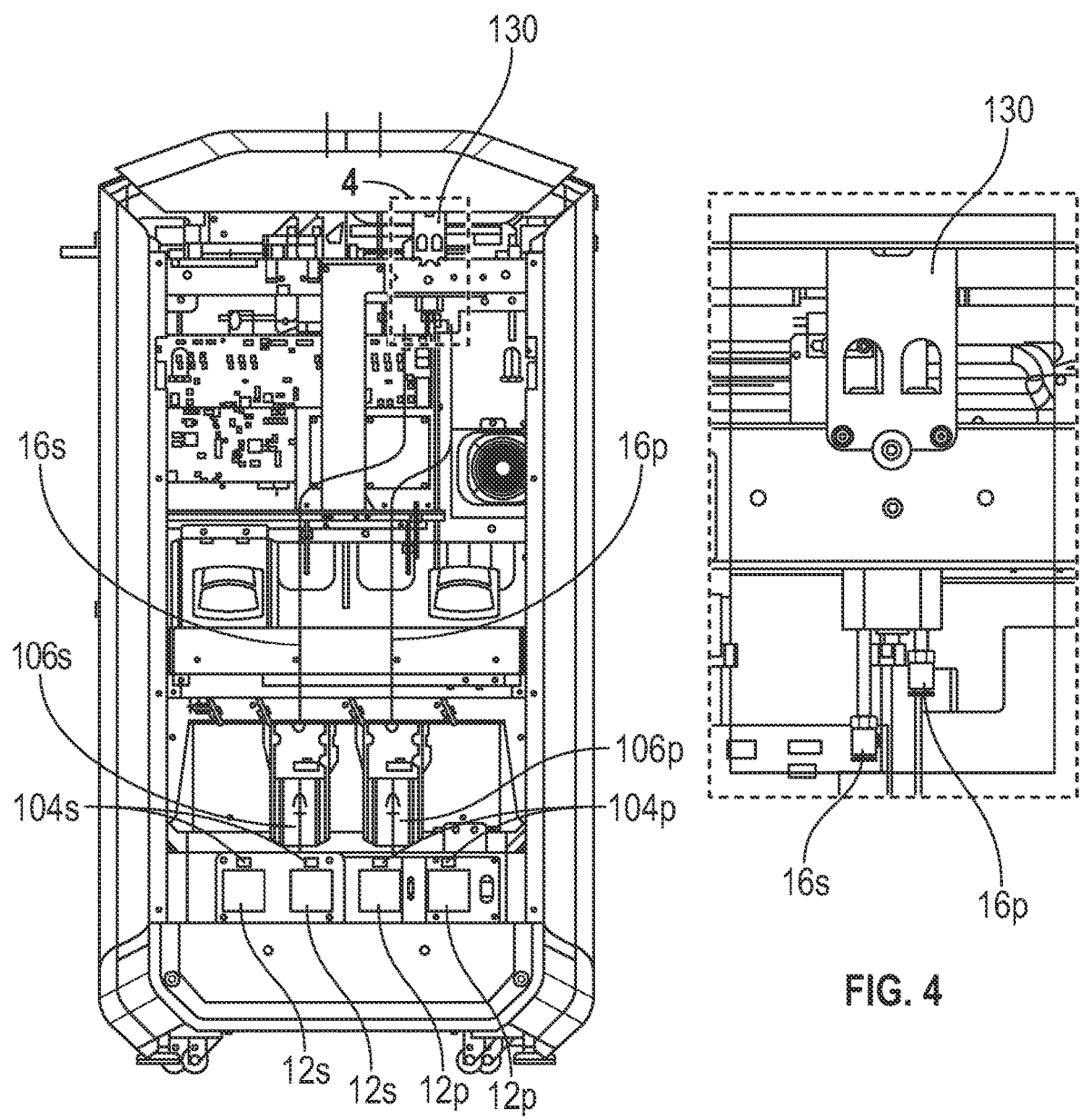
FIG. 3 is a schematic, back view of a low pull force filament delivery system for use in a 3D printer.
FIG. 4 is a schematic view of a accumulator assembly of the low pull force filament delivery system.

FIG. 2 illustrates an example embodiment of two print heads 18p and 18s which include the feed drives of the filament delivery system of the present disclosure. The shown print heads 18p and 18s are similarly configured to receive a consumable filament, melt the filament in liquefier 20 to product a molten material, and extrude the molten material from a nozzle tip 14 of liquefier 20. A motor (not shown) is configured to receive power from printer 10 via electrical connections for rotating a threaded-surface gear of motor. The rotating gear of motor 19 engages a feed drive 21 to convey rotational power to the filament 17 and drive the filament 17 into the liquefier 20, as illustrated in FIG. 2A. The feed drive 21 is illustrated as a single counter-rotating drive. However, a Quad drive or a Hex drive as described in Stratasys PCT Patent Application No. PCT/US2019/061524 are also within the scope of the present disclosure. Motor 19 may be encased within print head 18 or may be a component of printer 10. Examples of suitable liquefier assemblies for print head 18 include those disclosed in Swanson et al., U.S. Pat. No. 6,004,124; and Batchelder et al., U.S. Pat. No. 8,439,665. In additional embodiments, in which print head 18 is an interchangeable, single-nozzle print head, examples of suitable devices for each print head 18, and the connections between print head 18 and head gantry include those disclosed in Swanson et al., U.S. Pat. Nos. 8,419,996, 8,647,102; and Barclay et al., U.S. Pat. No. 10,513,104.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, filament drive mechanisms, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively advance successive segments of the consumable filaments from consumable assembly 12 through guide tubes 16 and into the liquefier 20.

In some embodiments, the present disclosure includes a filament delivery system that is used to deliver a fragile filament composition, such as highly loaded and/or brittle filament, from a source to a print head such that the filament encounters 0.5 lbs of force or less.

Referring to FIGS. 3-10, a substantially sealed, low pull force filament delivery system is illustrated at 100. System 100 is configured for feeding filament from two selected sources 12 to each of two print heads 160 along two separate feed paths 16s and 16p (best shown in FIG. 5), wherein filament is advanced the feed path by a feed drive 162 used in cooperation with a loading drive 104. In the shown embodiment, the feed paths 16s and 16p are routed through a single accumulator assembly 130, which comprises two accumulators 131 housed within a block 133.

Each of feed path 16p and 16s are defined primarily by a filament guide tube comprising a guide tube section 114 located upstream of accumulator assembly 130 and a guide tube section 156 located downstream of accumulator assembly 130, and secondarily by a conduit 102, a manifold 106, manifold inlet paths 108 and 110, and the accumulator 131. The guide tube 156 is retained in a bracket 150 which maintains the feed path a proper radius to reduce pull force by the feed drive 162. Conduit 102 connects the filament source 12 (shown as two part material sources 12p and two support material sources 12s) to the loading drive 104 located proximate to the source 12, where each source 12 has a dedicated loading drive 104 and manifold inlet path 108 or 110. Manifold 106 as shown has two inlets sealably coupled to paths 108 and 110 respectively, that combine into a single outlet 112. Manifold outlet 112 is sealable coupled to guide tube section 114 at an upstream end 116 thereof. A downstream end 118 of each guide tube section 114 is coupled to accumulator 131.

Each accumulator 131 comprises a pin 120, a through bore 132, a linear bearing 134 defining a portion of the through bore 132, a pin 120 inserted in the through bore 132, and a level sensor comprising lower and upper proximity sensors 140 and 142 configured to detect a position of pin 120. A center channel of pin 120 receives filament from the guide tube section 114 and forms a portion of the filament feed path. A sealing connector 122 couples an inlet of pin 120 to the downstream end 118 of guide tube section 114. An outer surface 121 of pin 120 engages linear bearing 134, and pin 120 is slidable in direction of arrows 126 and 128 relative to the fixed position of the through bore 132 to increase and decrease a length of the filament path in a telescoping manner.

While two sources of 12 of filament for both the part and support material are illustrated and described, the filament delivery system of the present disclosure can be utilized in other configurations, including printers using a single source 12 per print head thus eliminating the use of manifold 106, more than two sources 12 where the manifold 106 includes any number of inlets that corresponds to the number of sources 12, a shared loading drive 104 at the outlet of manifold 106, and a single source supplying a single print head. The low pull force delivery system operates the same for any filament regardless of its material composition and regardless of whether it is provided as a part filament or a support filament; therefore, only one low pull force deliver system will be described in detail herein.

The loading drive 104 can be any automated drive to controllably advance filament and hold filament. Examples of suitable loading drives in the prior art include those described in Swanson U.S. Pat. No. 6,923,634. In the exemplary embodiment, loading drive 104 is a low compressive force drive comprising a plurality of substantially synchronized drives, and is particularly advantageous for use with fragile filament. The loading drive 104 is described in more detail in FIGS. 11-16, below.

Referring back to FIGS. 5-7, the linear bearing 134 engages an outer surface 121 of the pin 120 to aid in smoothly guiding the pin 120 within the through bore 132 and to minimize the amount of force needed to move the pin 120 within the accumulator 131. In this exemplary configuration, the linear bearing 134 also acts as a seal with the outer surface 121 of the pin 120 to maintain the low pull force delivery system 100 in a sealed configuration, together with the sealing connector 122. The telescoping action of the pin 120 within the through bore 132 of the accumulator 131 lengthens the feed path to accrue the slack of filament.

Figure 5:
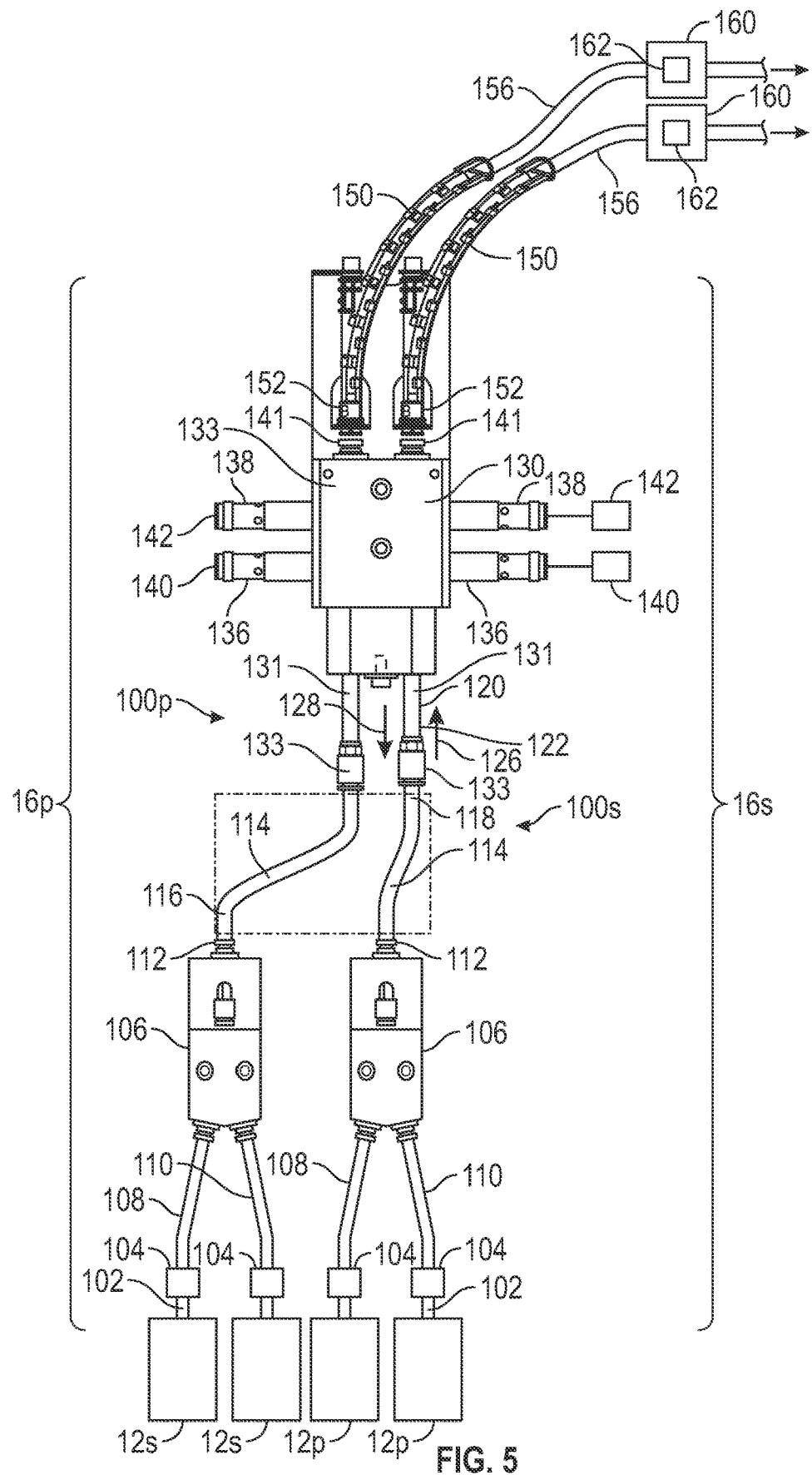
FIG. 5 is a schematic view of the low pull force filament delivery system.

The flexible guide tube 114 containing the slack of filament adopts a curved configuration as shown in FIG. 5, while the pin 120 maintains alignment with the through bore 132 in the accumulator 131. Maintaining the co-axial alignment of the pin 120 with through bore 132 allows the pin 120 to move freely in direction of arrows 126 and 128, which lengthens the overall filament path when the pin 120 is in its upstream position, and shortens the filament path when the rigid tube is in its downstream position.

The exemplary embodiment utilizes a level sensor comprising upper proximity sensor 140 and lower proximity sensor 142. The accumulator 131 includes a lower port 136 in communication with the through bore 132 and an upper port 138 that is also in communication with the through bore 132 wherein the sensor elements are retained. The lower proximity sensor 140 is sealingly positioned within the lower port 136 and the upper proximity sensor 142 is sealingly positioned within the upper port 138. The lower and upper proximity sensors 140 and 142 sense whether the pin 120 within the through bore 132 is present at the lower port 136 and the upper port 138. Via the use of the extended and contracted positioning of the pin 120, the slack of filament is generated to reduce the pull force felt by the filament from the feed drive to a maximum value selected to avoid fracturing the filament inside the feed path.

The flexible tube section 156 is downstream of the accumulator 131, where an upstream end 152 of a flexible tube 156 is connected to an outlet 141 from the accumulator 131 and a downstream end of the flexible tube 156 is connected to print head 160 having feed drive 162. The feed drive 162 engages and pulls the filament from the feed path and drives the filament into the liquefier of print head 160 for extrusion. Positioning the fixed location of the accumulator assembly 130 relatively close to the print head will minimize feed drive pull force requirements, given that the filament friction drag in the tubing increases with feed tube length; increased pull force requirements are more abusive to fragile filament materials.

The substantially free linear movement of the pin 120 relative to the fixed position of the through bore 132 in the accumulator block 133, forming a telescoping joint, increases the length of the feed path between the manifold outlet 112 and the block 133 (and therefore increases the length of the overall feed path 16p) as the pin 120 moves downward or descends in direction of arrow 128 and decreases the length of the feed path as the pin 120 moves upward or ascends in the direction of arrow 126. The ability to create a slack of filament by increasing the length of the feed path using the accumulator 131 allows filament to be driven into the feed path by the loading drive 104 without affecting the performance of the feed drive 162.

Figure 6:
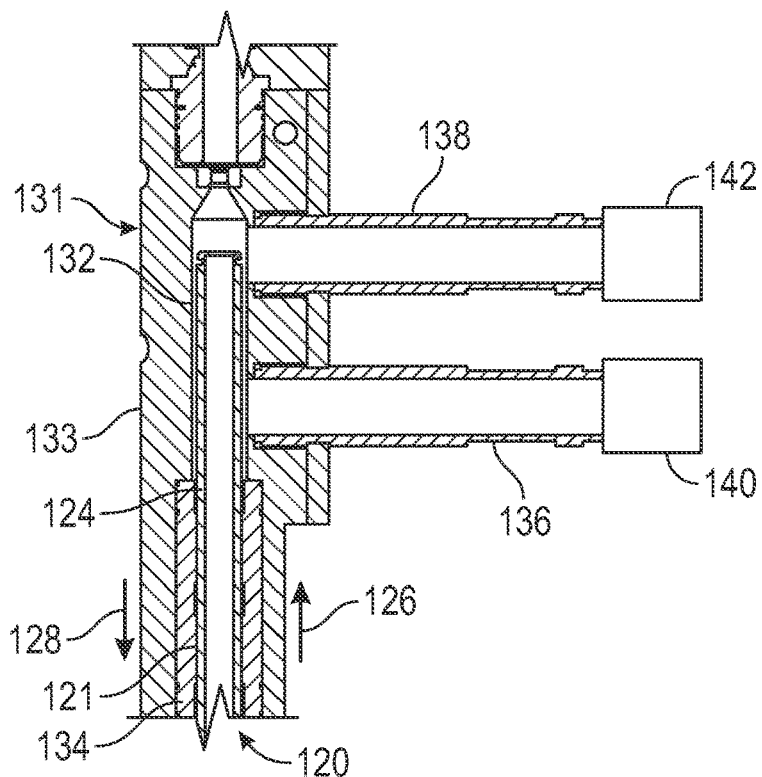
FIG. 6 is a cut away view of an accumulator with a pin in an ascended position.
Figure 7:
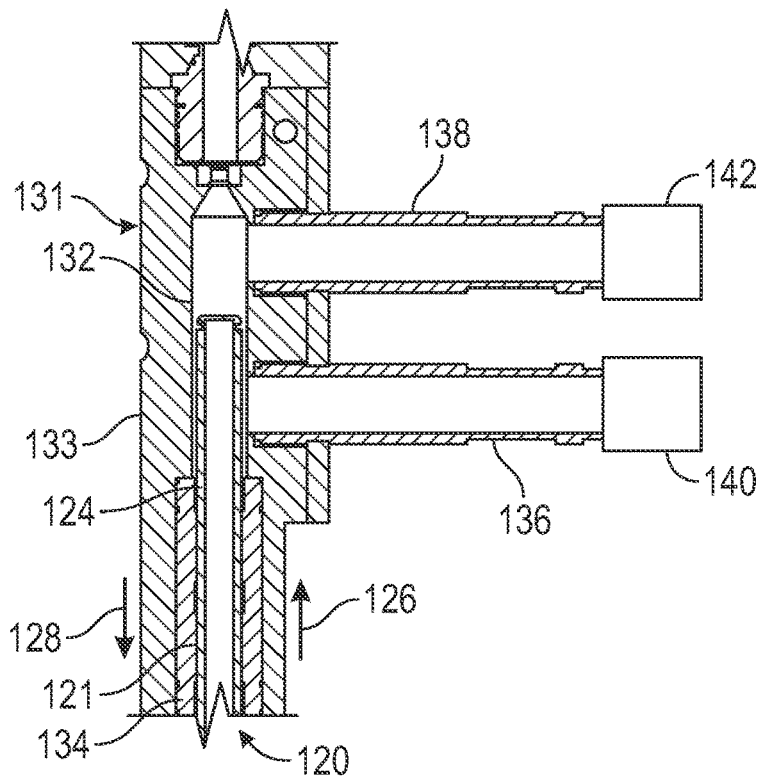
FIG. 7 is a cut away view of an accumulator with a pin between an ascended position and a descended position.
Figure 8:
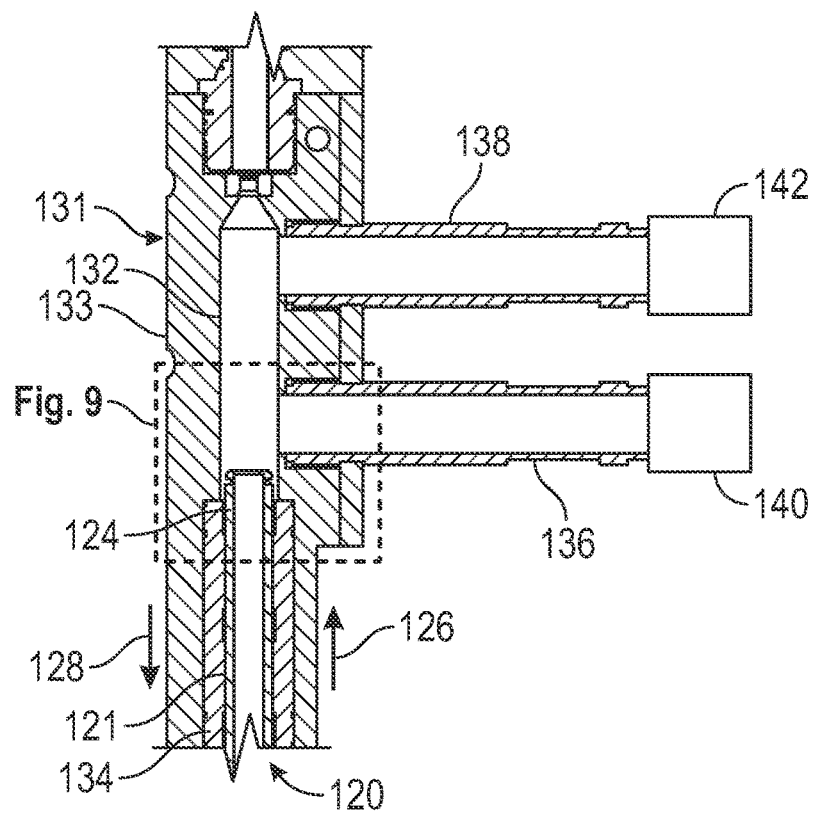
FIG. 8 is a cut away view of an accumulator with a pin in a descended position.
Figure 9:
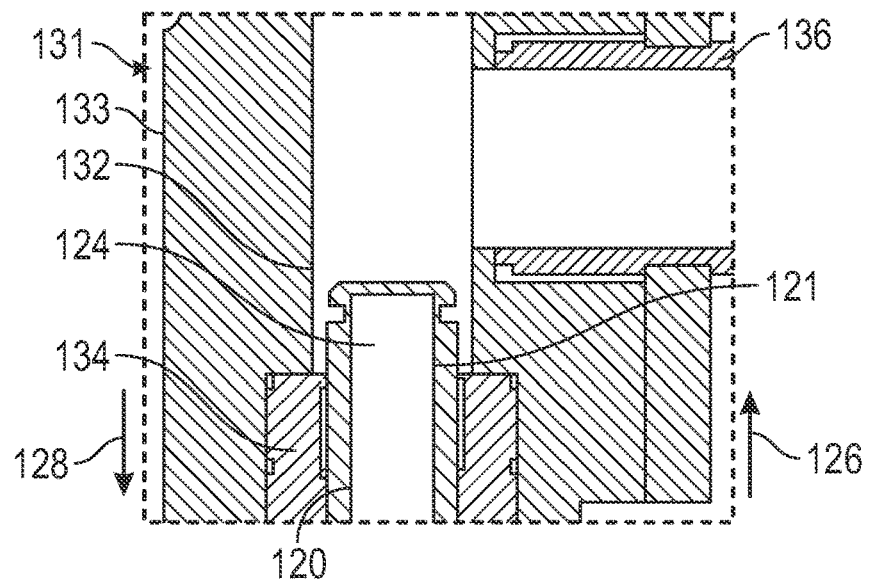
FIG. 9 is a detailed view of the accumulator shown in FIG. 8.

Referring to FIGS. 6-9, by way of example, in operation, the loading drive 104 is deactivated and retains the filament positioned within it therein, the pin 120 is descended from the accumulator assembly 130 in an extended position such the overall filament feed path length in the system is increased and a slack of filament is generated as illustrated in FIGS. 8 and 9. The feed drive 162 pulls filament from the flexible tube 156 between the accumulator assembly 130 and the print head 160, as the print head 160 calls for additional material to be melted. As the feed drive 162 pulls filament from the feed tube 156, the pin 120 slides downstream in the direction of arrow 126 due to the force placed on the flexible tube 114 by the filament, as illustrated in FIG. 7, as the slack of filament is consumed. When the pin 120 reaches a contracted position, the loading drive 104 is activated to advance filament from source 12, to again collect a slack of filament in the feed path as it is extended.

Utilizing the sensor configuration of the exemplary embodiment, when the pin 120 is sensed by the lower proximity sensor 140, sensor 140 communicates this to the controller assembly 38 and the loading drive 104 is signed to deactivate so that a slack of filament will accrued. As the filament is consumed, the pin 120 ascends or moves in direction of arrow 126 and is sensed by the upper proximity sensor 142 when the differential length of filament is fully consumed, as illustrated in FIG. 6. Once the pin 120 is sensed by the upper proximity sensor 142, a signal is sent from the controller assembly 38 to activate the loading drive 104. The loading drive 104 forces filament into the flexible tube 114 at a rate faster than the feed drive 162 forces filament into the liquefier such that filament accumulates in the flexible tube 114 between the outlet 112 of the manifold 110 and the accumulator assembly 130. As the filament continues to be driven by the loading drive 104, it allows the pin 120 to descend and slide upstream in direction of arrow 128. As the pin 120 descends in direction of arrow 128, a top end of the pin 120 moves below the upper proximity sensor 142, where the lack of the pin 120 is sensed, as illustrated in FIG. 7. The pin 120 further descends below the lower proximity sensor 140, as illustrated in FIGS. 8 and 9, which is also sensed. When the upper end of the pin 120 is below the lower proximity sensor 140, a sufficient amount of filament is accumulated in the filament feed path due to the extended length of the feed path. At that time, the controller assembly 38 sends a signal to the loading drive 104 to cease driving filament into the feed path.

The feed drive 162 continues to consume filament which causes the length of filament between the outlet 112 and the loading drive 104 to be reduced. The reduced length of the filament causes the pin 120 to move or ascend in direction of arrow 126, which causes the pin 120 to be first sensed by the lower proximity sensor 140 and then ultimately by the upper proximity sensor 142, as the feed drive 162 consumes the filament. The process of accumulating and consuming filament is repeated until the part or support structure is printed with the desired amount of filament.

When the upper proximity sensor 142 senses the pin 120 rising due to the shortening of the overall filament path length between the loading drive 104 and the feed drive 16, the process of accumulating filament between the outlet 112 and the loading drive 104 is repeated until the part or support structure is printed with the desired amount of filament.

Figure 10:
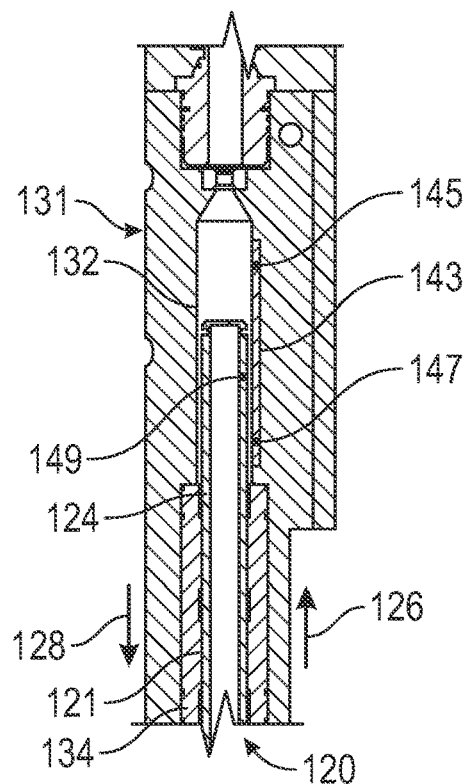
FIG. 10 is a cut away view of an accumulator with a sensor assembly on a pin and within a block having a through bore.
Figure 11:
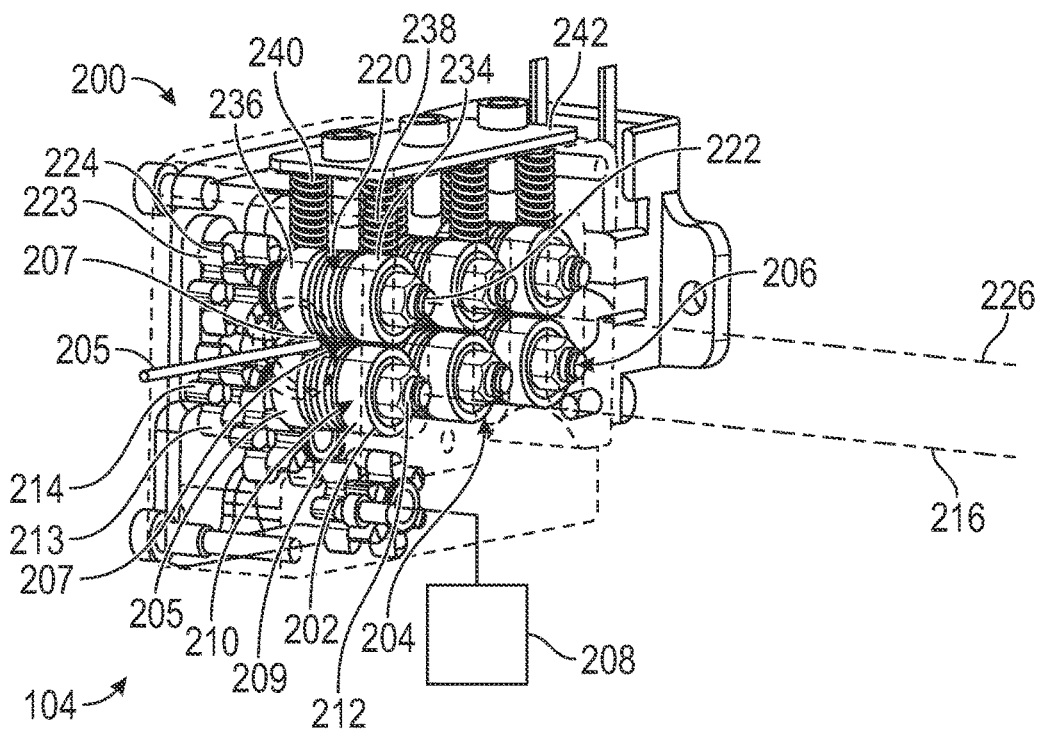
FIG. 11 is a cut away perspective view of a loading drive of the low pull force filament delivery system.

While proximity sensors 140 and 142 are illustrated and described as comprising the level sensor of the exemplary embodiment, other level sensors can also be utilized. Additionally, optical sensors, capacitive sensors, microwave sensor, photoelectric, ultrasonic sensors, or tomographic sensors could also be utilized in the sensor block to determine the extension of the telescoping joint. Other configurations could also be utilized where a sliding pin end positions are not sensed, but rather the sensors are attached to the sliding pin, and sense a stationary feature along the filament path in the accumulator. Referring to FIG. 10, a contact sensor is illustrated where a sensor 149 on the pin 120 contacts a sensing surface 143 in the through bore 132 wherein the sensor 149 location is sensed along a length of the sensing surface 143. When limits 145 and 147 along the sensing surface 143 are reached, the loading drive is activated and deactivated, as described above.

Further, limit switches could be used instead of the proximity sensors 140 and 142. When an upper limit switch is activated, the loading drive 104 would also be activated. When the lower limit switch is activated, the loading drive 104 would be deactivated. The process would continue between activating the upper limit switch and the lower limit switch to control the state of the loading drive 104.

Additionally, the length of filament accumulated in the filament feed path between the outlet 102 and the inlet to the sensor block 130 is substantially determined by a distance between the lower and upper proximity sensors 140 and 142. To increase the length of filament accumulation per cycle, the distance between the sensors 140 and 142 is increased, which will decrease the frequency of the accumulation cycle. To decrease the length of filament accumulation per cycle, the distance between the sensors 140 and 142 is decreased, which will increase the frequency of the accumulation cycle.

As illustrated, the accumulator assembly 130 utilizes a substantially vertical through bore 132 which allows gravity in aiding the pin 120 to descend from the sensor block 130 as the filament accumulates. However, the present disclosure is not limited to a sensor block 130 with a substantially vertical through bore 132. Rather, the through bore 132 can be at any angle ranging from vertical to horizontal.

When the through bore 132 is at an angle other than vertical, a biasing force may be used to move or aid in the move of the pin 120 out of the accumulator assembly 130. For example, a compression spring can used to force the pin 120 from the accumulator assembly 130 as filament is accumulated in the filament feed path. However, the amount of spring force must be taken into account when calculating the amount of pull force on the filament, as the filament must also be able to withstand the spring force and the pull force by the feed drive 162 without exceeding the threshold tensile force of the filament.

Additionally, the low pull force delivery system of the present disclosure as illustrated in FIG. 5 offsets the outlet 112 of the manifold 106 laterally and vertically from the inlet to the accumulator assembly 130 to utilize gravity and the mechanical properties of the tubing to assist in the ascension and descension of pin 120. However, other configurations of the tube are within the scope of the present disclosure, including aligning an inlet to the accumulator 131 and the outlet 112 vertically and causing the filament to form an arc during the accumulation process.

Referring to FIGS. 11-16, the low compressive force loading drive 104 is described. The loading drive 104 includes a casing 200 that is configured to accept and retain a plurality of counter-rotating drives 202, 204 and 206 that are in series and define a filament path 207 for a filament 205. Each drive applies a compressive force on opposing sides of the filament using counter-rotating members to force the filament into the flexible tube 114. By engaging the filament 205 with multiple drives in series, the frictional force on the filament 205 is increased, which allows the loading drive 104 to engage and move the filament with a low compressive force without deforming the filament 205.

The casing 200 is substantially sealed to prevent ambient conditions from affecting the filament properties.

The counter-rotating members of each plurality of drives have concave grooves about a circumference of each opposing member, wherein the grooves are substantially smooth and are configured to apply the compressive force on the filament to create friction to drive the filament into the flexible tube 114. The grooves in the opposing members have a radius which can accommodate the radius of the filament so as to optimize the contact area while preventing deformation of the filament, which provides a driving force on the filament.

While applying the compressive driving force, the members of the drives do not deform or indent the filament, as it has been discovered that applying any sort of surface marking or indentation to a fragile filament creates potential stress fracture sites. As such, the loading drive 104 of the present disclosure utilizes a biasing mechanism to allow one of the opposing members of each drive to move relative to the other opposing member to continue to apply a compressive force on the filament without exceeding a maximum desired compressive force.

Each of the counter rotating drives 202, 204 and 206 are similarly constructed. As such, only one of the drives 202 will be described in detail. The counter-rotating drive 202 includes a first counter-rotating member 210 that is fixedly retained to a first drive shaft 212. The first drive shaft 212 is fixedly attached to a first gear 214 that is directly or indirectly driven by a motor 208. The drive shaft 212 is retained in a fixed location and is configured to rotate about an axis of rotation 216. The first counter-rotating member 210 is retained within the casing 200 by spaced apart sleeves or bearings 205 and 207, which allow the member 210 to rotate therein while preventing erosion or wear on casing 200 by the member 210, which is typically constructed of a hardened metal material or coated with a hardened metal material, such as but not limited to carbide. The hardened metal material prevents wear on the first member 210 due to engagement with the highly loaded filament 205.

The counter-rotating drive 202 includes a second counter-rotating member 220 that is fixedly attached to a second drive shaft 222. A second gear 224 is fixedly attached to the second drive shaft 222 where cogs 223 on the second gear 222 intermesh with cogs 213 on the first gear to cause the first and second members 210 and 220 to counter-rotate and frictionally engage the filament. The second member 220 and the second gear 224 and the second shaft rotate about an axis of rotation 226.

A location of the axis of rotation 226 of the second drive shaft 222 is not fixed, which allows a distance between the first counter-rotating member 210 and the second counter-rotating member 220 to accommodate changes in diameter of the filament without applying excessive compressive forces. The casing 200 includes slots 230 and 232 that engage opposite ends of the second drive shaft 222, wherein the second drive shaft 222 can travel a length slots 230. The slots 230 and 232 are aligned substantially normal to a filament path 207 through the casing 200 to maintain alignment of the compressive force on the filament by the counter-rotating drive 202.

By way of non-limiting example, due to the movement of the second drive shaft 222 relative to the first drive shaft 212, the drive 202 can accommodate a filament with a nominal 0.070 inch diameter with a variation of ±0.020 inches, or a variation of about 30%. The disclosed diameters, compressive forces and variations can be changed to accommodate different sized filaments and printers, while the loading drive 104 maintains the same functionality.

The second counter-rotating member 220 is retained within sleeves or bearings 234 and 236 on opposing ends of the member 220. The sleeves or bearings 234 and 236 prevent or minimize the ability of the second counter-rotating member 220 movement from causing wear or erosion of the casing 200.

Spaced apart compression springs 238 and 240 are attached to the sleeves or bearings 234 and 236 and to a plate 242 on the casing 200. The plate 242 is constructed of a rigid material, such as metal, that can withstand the forces of the springs 238 and 240 without bending or flexing to maintain a desired amount of biasing force on the second member 220, which in turn applies a desired amount of force on the filament to drive the filament into the flexible tube 114.

As mentioned above, a filament can have variations in diameter, where the second member 220 is allowed to move due to the second drive shaft 222 being retained within the slots 230 and 232 and the compression springs 238 and 240 maintain a desired amount of frictional forces on the filament of varying diameter. Additionally, the space apart springs 238 and 240 maintain the alignment of the second member 220 relative to the first member 210. If a single spring were utilized, the second member 220 could become askew from the first member 210 and not provide the necessary frictional force needed to drive the filament into the flexible tube 114.

Figure 12:
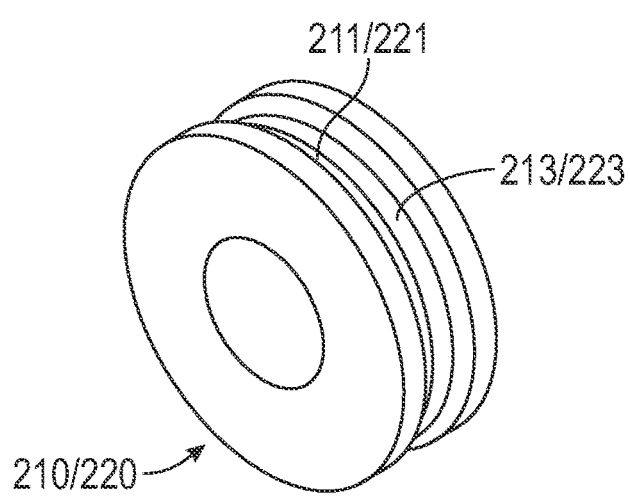
FIG. 12 is a perspective view of a counter-rotating member of a filament drive.
Figure 13:
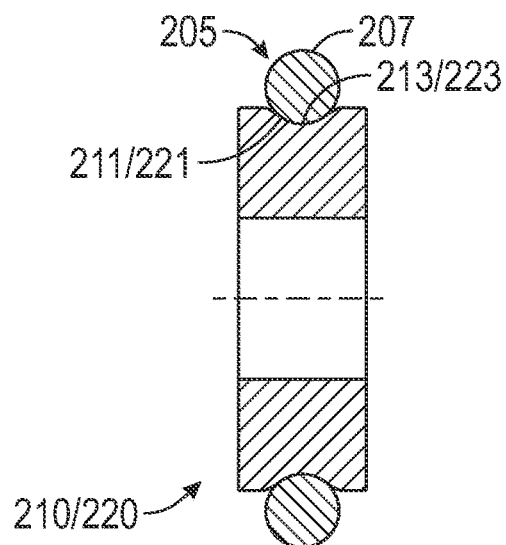
FIG. 13 is sectional view of the counter-rotating member of FIG. 12 engaging a filament.

Referring to FIGS. 12 and 13, each counter rotating engaging member 210 and 220 are similarly constructed. Each member 210 and 220 includes a concave groove 211 and 221 that has a surface 213 and 223 having a radius which can accommodate the nominal radius 207 of the filament 205. In one embodiment, the radium can be similar to that of the nominal radius of the filament. In alternative embodiments, it can be larger than the radius of the filament, so as the printer can accommodate a variety of filament diameter sizes. Having surfaces 213 and 223 with a radius similar to that of the nominal radius 207 of the filament 205, increases surface contact area and therefore improves the localized frictional driving force between the members 210 and 220, which aids in pushing the filament without deforming, indenting or otherwise demarcating the filament surface.

Figure 14:
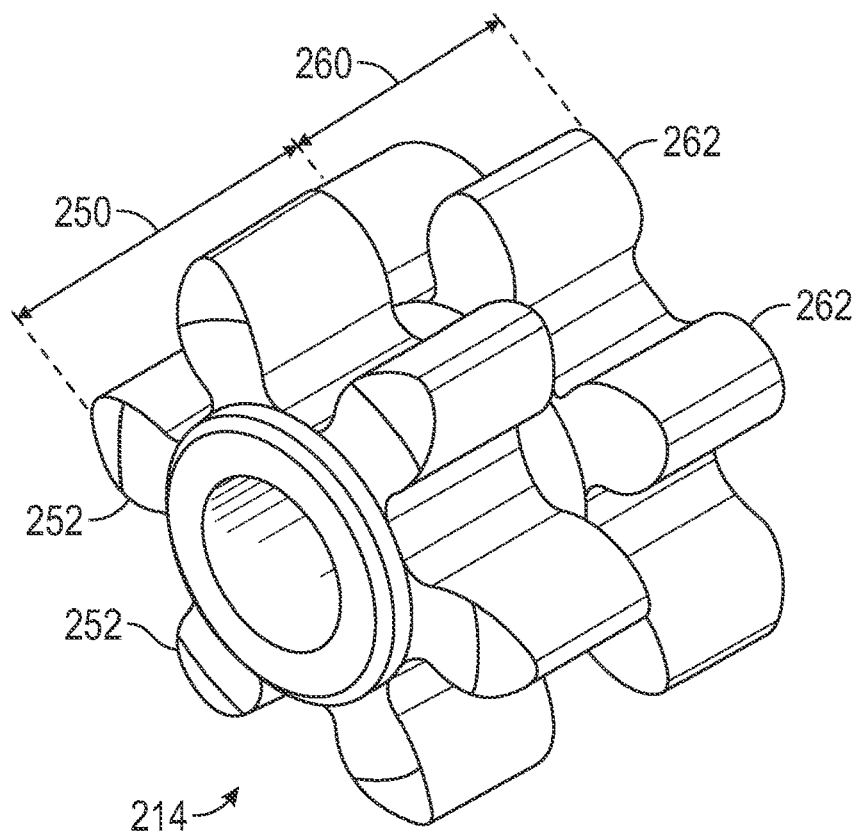
FIG. 14 is a perspective view of a gear for the loading drive.
Figure 15:
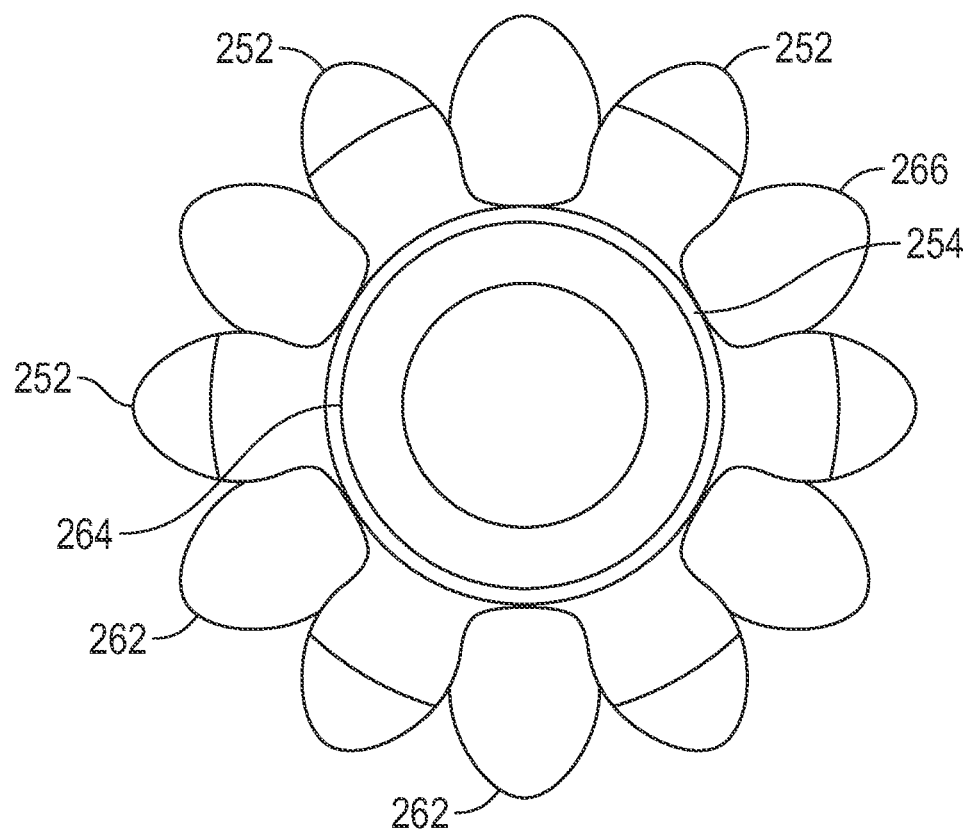
FIG. 15 is a front view of the gear of FIG. 14.

Because the second drive shaft 222 moves relative to the first drive shaft 212, the present disclosure utilizes gears 214 and 224 that are similarly constructed but include offset cogs to increase the surface area of contact, which in turn increases the reliability of the loading drive 104. Referring to FIGS. 14 and 15, an exemplary gear for gear 214 and 224 is illustrated where gear 214 will be described in detail.

The gear 214 is of a monolithic or one-piece construction and has a first portion 250 having a first plurality of cogs 252 and a second portion 260 with a second plurality of cogs 262. The first plurality of cogs 252 and the second plurality of cogs 262 are substantially out of phase, where a valley 254 in the first plurality of gods 252 is substantially aligned with a peak 266 on the second plurality of cogs 262. Similarly, a valley 264 in the second plurality of cogs 262 is substantially aligned with a peak 256 in the first plurality of cogs 252.

Utilizing the gears 214 and 224 with the same construction having the first and second portions 250 and 260 with the out of phase cogs 252 and 262 increases the surface area between the cogs 252 and 262 which aids in providing reliability to the rate at which the filament is driven while the second engaging member 220 moves relative to the first engaging member 210.

Figure 16:
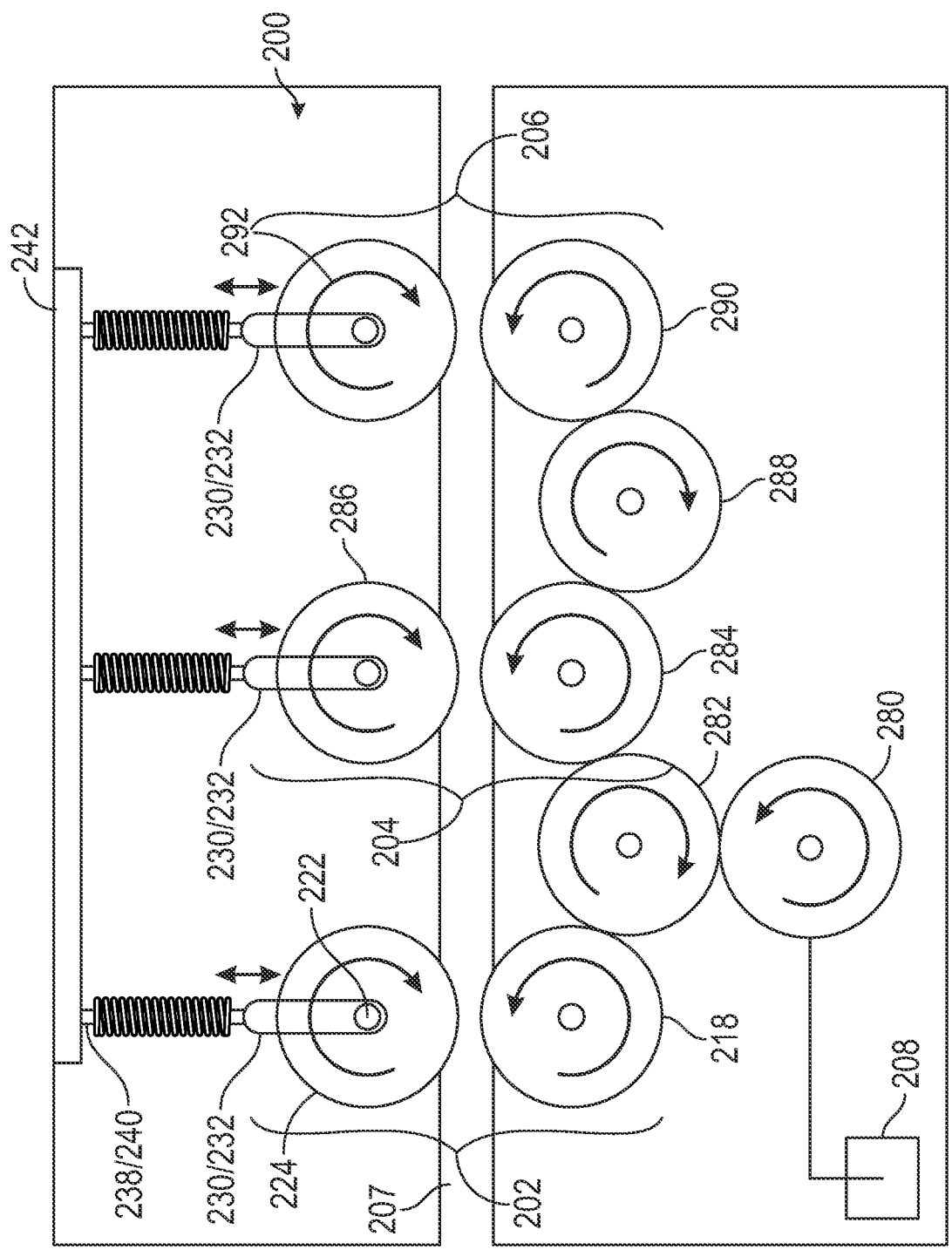
FIG. 16 is a schematic view of the loading drive of FIG. 11.

Referring to FIG. 16, the motor 208 drives a drive gear 280 having the same construction as the gear 214. The drive gear 280 drives a bridge gear 282 that engages gears 214 and 284. Gear 214 engages and counter-rotates with gear 224 and gear 284 engages and counter rotates with gear 286. Bridge gear 288 engages and counter rotates with respect to the gear 284 where bridge gear 288 engages gear 290. Gear 290 engages and counter rotates with gear 292.

As illustrated a single motor 208 causes each of the drives 202, 204 and 206 to synchronously engage the filament using the disclosed gear train. However, other gear trains are within the scope of the present disclosure including locating the drive on one of the bridge gears 282 or 288 or one of the stationary gears 214, 284 or 290.

The filament delivery systems of the present disclosure can be used to advantage with filament formed of any of a variety of materials, but are particularly suitable for use in feeding fragile filament materials, such as filament containing fillers or filament having a low durometer, that have a lower tensile strength or that are otherwise challenging to feed using typical filament drive mechanisms and delivery systems of the prior art.

A filled or bound particle filament may be formed of metal, ceramic, mineral, glass bubbles, glass spheres or combinations and mixtures of such particulates in a polymeric matrix. Bound particle filaments are described, for example, in Heikkila U.S. Pat. No. 9,512,544. As described therein, an exemplary bound filament is comprised of about 1-70 wt. % of a thermoplastic polymer; and about 30-99 wt. % of a particulate dispersed in the polymer, the particulate having a particle size of less than 500 microns, and being configured to achieve a dense packing of particle distribution. Other types of particulate filaments include composite filaments such as are described in Priedeman U.S. Pat. No. 7,910,041. As described therein, nanofibers are added to a carrier material to manipulate the properties of the filament. A bound particle filament is more rigid than a typical fused deposition modeling filament, and has been demonstrated to slip against the drive wheels used to feed softer filaments.

Low durometer materials include, but are not limited to, elastomeric materials, polyurethanes, polyesters, polyethylene block amides, silicone, rubber and vulcanates. Such low durometer materials tend to have tacky surfaces so that the materials have a generally high coefficient of friction relative to typical materials used for fused deposition modeling 3D printing, such as ABS, PC, and PLA. The elasticity, reduced stiffness and tackiness of the low durometer materials has been found to cause feed-rate errors, jams, and inaccurate extrusion rates in the print heads of the prior art, as the low durometer filament tends to stretch, slip, kink, tear, crumble and/or jam in the prior art filament drive mechanisms.

Depending upon the fragility of the filament material selected, the amount of compression applied by the low compressive force loading drive of the present disclosure can be applied in combination with the selection of number of drive wheels. The more drive wheels used, the more surface contact made, and the less compressive force needed by any one set of drive wheels. Particularly fragile materials benefit from having more drive wheels, and less compressive force application to the surface (less demarcation damage potential to the surface). For less fragile filament materials, more compressive force can be applied to the surface without demarcation damage, and fewer drive wheels can be used, or the surface texture of the drive wheels can be roughened, textured, made non-smooth, or utilize teeth for better "grab" or drive application to the filament passing through the drive path.

By way of example, a filament such as that using PEKK as a binder mixed with chopped carbon fiber as a fill material, or POM with metal or ceramic particulates, or unfilled TPU elastomers all may be considered to be fragile in nature. The higher the level of particulates, the weaker the overall filament structure will be when subjected to pull force. The more elastomeric the TPU material, the more stretchy or relaxed it will become when subjected to pull force. Fragile filament, while relatively weak in tensile pull strength, is relatively strong in compressive strength and can withstand about to about 3 lbs without yielding to deformation. Knowing the force at which the filament yields, the springs 238 and 240 with a relatively lower force can be utilized, such as about 1.5 lbs of compressive force. Maintaining the compressive force below the yield force prevents deformation of the filament, which prevents deformation and loss of strength.

EXAMPLE

The present disclosure is more particularly described in the following examples that are intended as illustrations only, since numerous modifications and variations within the scope of the present disclosure will be apparent to those skilled in the art.

Example 1

The filament loading system of the present invention was installed in a Stratasys® F370™ 3D printer manufactured by Stratasys, Inc. of Eden Prairie, Minn. The feed drive was a Quad drive as described in Stratasys PCT Patent Application No. PCT/US2019/061524. The loading drive was a low compressive force Hex drive as shown in FIGS. 11-16 herein.

Test parts were successfully printed using a bound metal particle filament having a 0.068"+/−0.020" diameter. The filament material composition tested is a stainless steel-filled polyoxymethylene (POM) thermoplastic part material, loaded at 72 vol. % stainless steel/28 vol. % POM. The filament is characterized as a fragile filament, having a low tensile strength and brittleness.

Measured mechanical properties of the filament: Tensile yield strength of approximately 600 psi, which results in a breaking force of approximately 2.25 lbs. Compressive yield strength of approximately 6 lbs. compressive force.

Filament loading system design constraints used for printing this filament: Print head pull force limit of 0.5 lbs. applied by the feed drive. Compressive force limit of 3 lbs. applied by the loading drive onto the filament (designed at 50% of filament yield strength). This provided approximately 1.5 lb of push force. This resulted in the successful printing of a part with the highly loaded filament.

The same filament material was run in an unmodified, commercially-available Stratasys® F370™ 3D printer and did not successfully print parts. The filament was observed to fracture and break in the feed path.

Although the present disclosure has been described with reference to preferred embodiments, workers skilled in the art will recognize that changes may be made in form and detail without departing from the spirit and scope of the disclosure.

The invention claimed is:

1. A system for feeding a filament from a source to a print head in a 3D printer, the system comprising:
    a source of filament;
    a loading drive in a filament path and located downstream from the source of the filament, the loading drive having an inlet and an outlet, the filament source couple to the inlet of the loading drive with a first conduit;
    a length of tubing having a first end and a second end wherein at least a portion of the tubing is flexible, the first end being directly or indirectly attached to the outlet of the loading drive;
    a accumulator assembly comprising:
        a block comprising a through bore extending from a first end to a second end wherein a portion of the tubing proximate the second end of the length of tubing is slidably movable within the through bore to form a telescoping joint;
        a first sensing port in communication with the through bore; and
        a second sensing port in communication with the through bore and spaced from the first communication port,
    the print head downstream in the filament path from an outlet of the through bore in the accumulator assembly and coupled to the accumulator assembly with a second conduit, the print head comprising a feed drive and a liquefier;
    a first sensor sealingly attached to the first sensing port; and
    a second sensor sealingly attached to the second sensing port;
    wherein an effective length of the tubing between the loading drive and the accumulator assembly is increased by feeding filament into the tubing from the loading drive at a rate greater than a rate of the feed drive such that the tubing is coaxially moved from the accumulator assembly in the telescoping joint until the first sensor does not detect the presence of the second end such that the loading drive is stopped and wherein the tubing linearly moves within the accumulator assembly in the telescoping joint until the tubing is sensed by the first and second sensors, which causes the loading drive to be activated and force filament into the tubing at the rate greater than a rate of the feed drive of the tubing, such that the loading drive does not interfere with the feed drive.

2. The system of claim 1, wherein the length of tubing comprises:
    a first flexible portion; and
    a pin coupled to the first flexible portion, wherein the pin is positionable with the through bore of the accumulator assembly, wherein the pin and the through bore comprise the telescoping joint.

3. The system of claim 2, wherein the accumulator assembly further comprises a linear bearing configured to engage and a guide the pin within the through bore.

4. The system of claim 1, wherein the first and second sensors comprise proximity sensors configured to sense a presence of the tubing proximate the first and second ports.

5. The system of claim 1, wherein the loading drive comprises a plurality of pairs of counter-rotating members configured to frictionally engage the filament within substantially smooth concave grooves, such that the filament exiting the loading drive is substantially a same configuration as the filament entering the loading drive.

6. The system of claim 5, wherein on of the counter-rotating members of each of the pairs of counter-rotating members is biased toward the other member with a force below that of a maximum compressive force of the filament.

7. A system for feeding a filament from a source to a print head in a 3D printer, the system comprising:
    a loading drive located proximate the source of the filament;
    the print head having a feed drive; and
    a length of a filament path connecting the loading drive and the feed drive, the length of filament path comprising:
        a block comprising a through bore extending from a first end to a second end and having an axis extending through the first end and the second end; and
        a portion of the filament path positionable within the through bore of the block with movement along the axis of the through bore, wherein the portion and the block comprise a telescoping joint;
        wherein the telescoping joint is configured to expand and contract the length of filament path between the loading drive and the feed drive whereby a slack of filament is accrued and consumed; and
    a controller configured to control the loading drive and the feed drive, wherein when the telescoping joint is in a first position where the length of the filament path is contracted, the loading drive is activated at a rate faster than a rate at which the filament is advanced into the print head such that the length of filament path expands until the telescoping joint reaches a second position, wherein the loading drive is deactivated.

8. The system of claim 7, wherein the telescoping joint comprises:
    an accumulator assembly comprising a block comprising a through bore extending from a first end to a second end wherein a portion of the tubing proximate the second end of the length of tubing is slidably movable within the through bore to form the telescoping joint;
    at least one sensor assembly having a first portion coupled to the filament path and the block and a second portion coupled to the block in the through bore, wherein the filament path moves within the block assembly the at least one sensor causes the controller to control the loading drive.

9. The system of claim 7, wherein the telescoping joint comprises:
    a first sensing port in communication with the through bore; and
    a second sensing port spaced from the first communication port.

10. The system of claim 9, wherein the portion of the filament path comprises:
    a flexible portion; and
    a pin attached to the flexible portion wherein the pin is positionable within the through bore of the block along the axis, wherein the pin and the through bore comprise the telescoping joint.

11. The system of claim 10, wherein the accumulator assembly further comprises a linear bearing configured to engage and a guide the pin within the through bore.

12. The system of claim 9, and further comprising first and second proximity sensors within the first and second ports, wherein the first and second proximity sensors configured to sense a presence of the tubing proximate the first and second ports.

13. The system of claim 7, wherein a maximum tensile stress on the filament is 0.5 lbs or less.

\* \* \* \* \*